United States Patent
Lin et al.

(10) Patent No.: US 9,253,296 B2
(45) Date of Patent: Feb. 2, 2016

(54) WIRELESS COMMUNICATION DEVICE

(71) Applicant: Chiun Mai Communication Systems, Inc., New Taipei (TW)

(72) Inventors: Che-Yen Lin, New Taipei (TW); Jin-Bo Chen, New Taipei (TW); Cho-Kang Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 146 days.

(21) Appl. No.: 14/039,187

(22) Filed: Sep. 27, 2013

(65) Prior Publication Data
US 2014/0329570 A1    Nov. 6, 2014

(30) Foreign Application Priority Data
May 3, 2013    (TW) .............................. 102115990 U

(51) Int. Cl.
*H04M 1/02*    (2006.01)
*G06F 1/16*    (2006.01)

(52) U.S. Cl.
CPC ........... *H04M 1/0277* (2013.01); *G06F 1/1624* (2013.01); *H04M 1/0266* (2013.01)

(58) Field of Classification Search
CPC .......... H04M 1/02; H04M 1/028; H01Q 1/38; G06F 1/1624
USPC .................................. 455/575.7; 343/700, 770
See application file for complete search history.

(56) References Cited

U.S. PATENT DOCUMENTS

| | | | |
|---|---|---|---|
| 2008/0316115 A1* | 12/2008 | Hill et al. ...................... | 343/702 |
| 2009/0262027 A1* | 10/2009 | Hsu ........................ | 343/700 MS |
| 2012/0274527 A1* | 11/2012 | Ayatollahi ..................... | 343/770 |
| 2012/0309473 A1* | 12/2012 | Choo et al. .................. | 455/575.7 |
| 2012/0329531 A1* | 12/2012 | Park et al. ...................... | 455/572 |
| 2013/0027892 A1* | 1/2013 | Lim et al. ....................... | 361/748 |

* cited by examiner

*Primary Examiner* — William Nealon
(74) *Attorney, Agent, or Firm* — Novak Druce Connolly Bove + Quigg LLP

(57) ABSTRACT

An exemplary wireless communication device includes a circuit board, a metal board, and a display module. The circuit board includes two groups of connecting terminals. The metal board is located on the circuit board and includes two metal bodies. The display module is located on the metal board. One metal body is electronically connected to one group of connecting terminals. The other metal body is electronically connected to the other group of connecting terminals.

19 Claims, 4 Drawing Sheets

WIRELESS COMMUNICATION DEVICE

BACKGROUND

1. Technical Field

The disclosure generally relates to wireless communication devices, and particularly to a wireless communication device having a better radiating capability.

2. Description of Related Art

Wireless communication devices such as mobile phones often include multiple functions such as a global positioning system (GPS) function, a Bluetooth (BT) function, and a WIRELESS FIDELITY (WI-FI) function. Accordingly, an antenna which can support the GPS function and the BT/WI-FI function is required in the wireless communication device.

However, because of the miniaturization of the wireless communication device, space available for the antenna is limited. Therefore, can be a challenge to design the antenna which can support GPS and BT/WI-FI functions within a smaller space.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
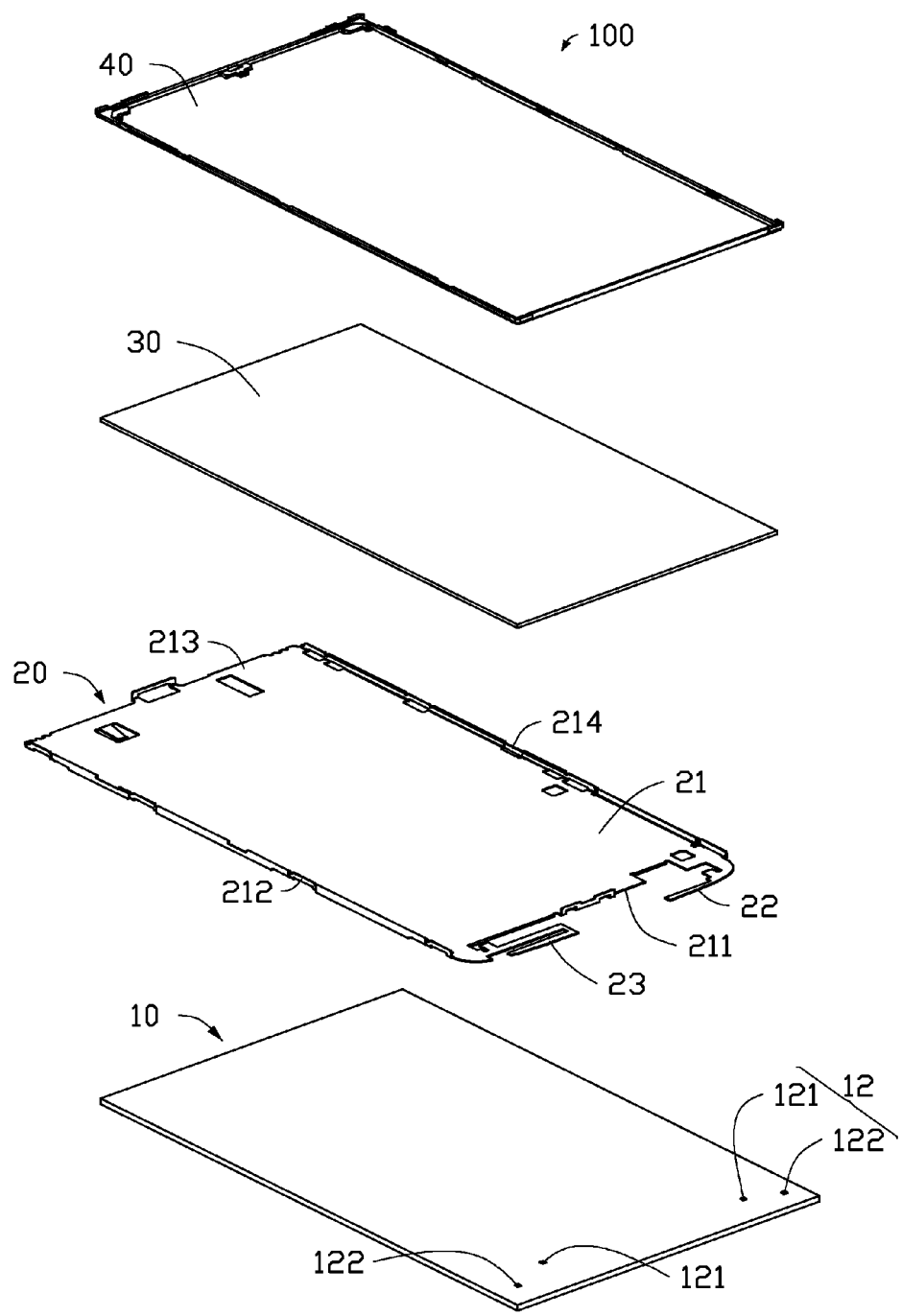
FIG. 1 is an isometric, exploded view of a wireless communication device, according to an exemplary embodiment.

FIG. 1 is a schematic, isometric view of a wireless communication device 100, according to an exemplary embodiment. The wireless communication device 100 may be a mobile phone or a personal digital assistant, for example. The wireless communication device 100 includes a circuit board 10, a metal board 20, a display module 30, and a metal frame 40. The metal board 20 is located on the circuit board 10 and is configured to support the display module 30. The display module 30 can be a liquid crystal display panel. The metal frame 40 surrounds a periphery of the display module 30. The display module 30 integrated with the metal frame 40 is located on the metal board 20. That is, the metal board 20 is sandwiched between the circuit board 10 and the display module 30.

The circuit board 10 includes two groups of connecting terminals 12. One group of connecting terminals 12 is located on a first side of the circuit board 10. The other group of connecting terminals 12 is located on a second side of the circuit board 10 opposite to the first side. Each group of connecting terminals 12 includes a feed terminal 121 and a ground terminal 122 adjacent to the feed terminal 121. The feed terminal 121 of each group of connecting terminals 12 feeds current for antennas of the wireless communication device 100. The ground terminal 122 of each group of connecting terminals 12 provides grounding for the antennas of the wireless communication device 100.

The metal board 20 is secured to the circuit board 10 by screws. In other embodiments, the metal board 20 can be secured to the circuit board 10 by any other suitable securing method. The metal board 20 includes a main body 21, a first metal body 22, and a second metal body 23. The main body 21 is substantially a rectangular plate. The main body 21 includes a first end 211, a second end 212, a third end 213, and a fourth end 214. The first end 211 and the third end 213 are parallel to each other. The second end 212 and the fourth end 214 are parallel to each other and perpendicularly interconnected between the first end 211 and the third end 213.

Figure 2:
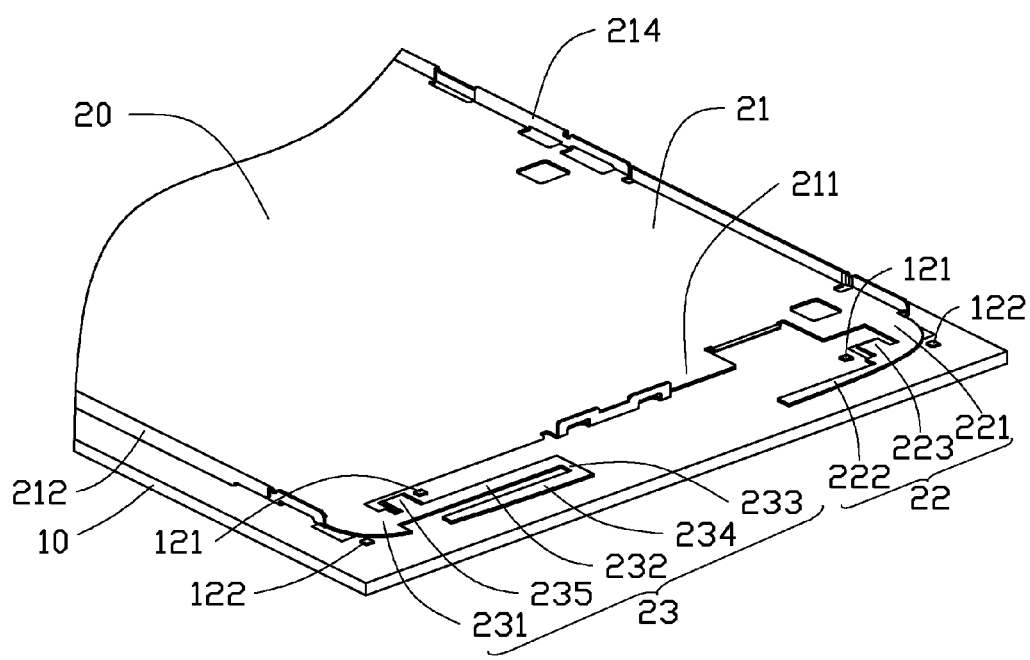
FIG. 2 is a partially, assembled view of the wireless communication device shown in FIG. 1.

The first metal body 22 is electronically connected to a junction of the first end 211 and the fourth end 214 and extends away from the first end 211. When the metal board 20 is secured to the circuit board 10, the first metal body 22 is located above the circuit board 10. FIG. 2 shows that the first metal body 22 includes a first ground portion 221, an extending portion 222, and a first feed portion 223. The first ground portion 221 is connected to a junction of the first end 211 and the fourth end 214 and extends in a direction opposite to the fourth end 214. The first ground portion 221 is electronically connected to the ground terminal 122 adjacent to the fourth end 214 by an elastic sheet (not shown). In other embodiments, the first ground portion 221 can be connected to the ground terminal 122 by other suitable connecting methods. The extending portion 222 is connected to the first ground portion 221, extends towards the second end 212, and is parallel to the first end 211. The first feed portion 223 is electronically connected to a side of the extending portion 222 adjacent to the first ground portion 221 and extends towards the first end 211. The first feed portion 223 is electronically connected to the feed terminal 121 adjacent to the fourth end 214 by an elastic sheet (not shown). In other embodiments, the first feed portion 223 can be connected to the feed terminal 121 by other suitable connecting methods.

The second metal body 23 is electronically connected to a junction of the first end 211 and the second end 212 and extends away from the first end 211. When the metal board 20 is secured to the circuit board 10, the second metal body 23 is located above the circuit board 10. The second metal body 23 includes a second ground portion 231, a first connecting portion 232, a second connecting portion 233, a third connecting portion 234, and a second feed portion 235. The second ground portion 231 is connected to a junction of the first end 211 and the second end 212 and extends towards the fourth end 214. The second ground portion 231 is electronically connected to the ground terminal 122 adjacent to the second end 212 by an elastic sheet (not shown). In other embodiments, the second ground portion 231 can be connected to the ground terminal 122 by other suitable connecting methods. The first connecting portion 232 is perpendicularly connected to the second ground portion 231, extends towards the fourth end 214, and is parallel to the first end 211. The second connecting portion 233 is perpendicularly connected to an end of the first connecting portion 232 and extends away from the first end 211. The third connecting portion 234 is perpendicularly connected to an end of the second connecting portion 233, extends towards the second end 212, and is parallel to the first connecting portion 232. A length of the third connecting portion 234 is less than a length of the first connecting portion 232. The first connecting portion 232, the second connecting portion 233, and the third connecting portion 234 cooperatively form a groove (not labeled). The second feed portion 235 is electronically connected to a side of the first connecting portion 232 adjacent to the second ground portion 231, extends towards the first end 211, and is parallel to the second connecting portion 233. The second feed portion 235 is electronically connected to the feed terminal 121 adjacent to the second end 212 by an elastic sheet (not shown). In other embodiments, the second feed portion 235 can be connected to the feed terminal 121 by other suitable connecting methods.

In assembly, the metal board 20 is secured to the circuit board 10, thereby the first metal body 22 and the second metal body 23 are located above the circuit board 10. The metal frame 40 is secured to and surrounds the display module 30. The display module 30 integrated with the metal frame 40 is located on the metal board 20. That is, the circuit board 10, the metal board 20, and the display module 30 integrated with the metal frame 40 are sequentially assembled.

Figure 3:
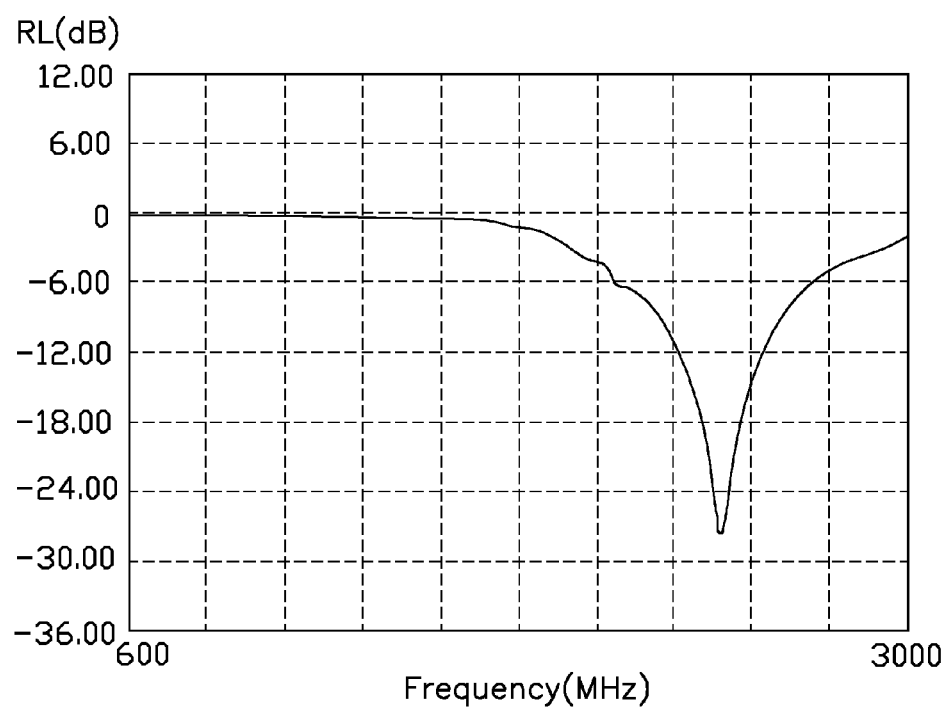
FIG. 3 is a diagram showing return loss (RL) measurements of the wireless communication device working at a BT/WI-FI frequency band, according to an exemplary embodiment.
Figure 4:
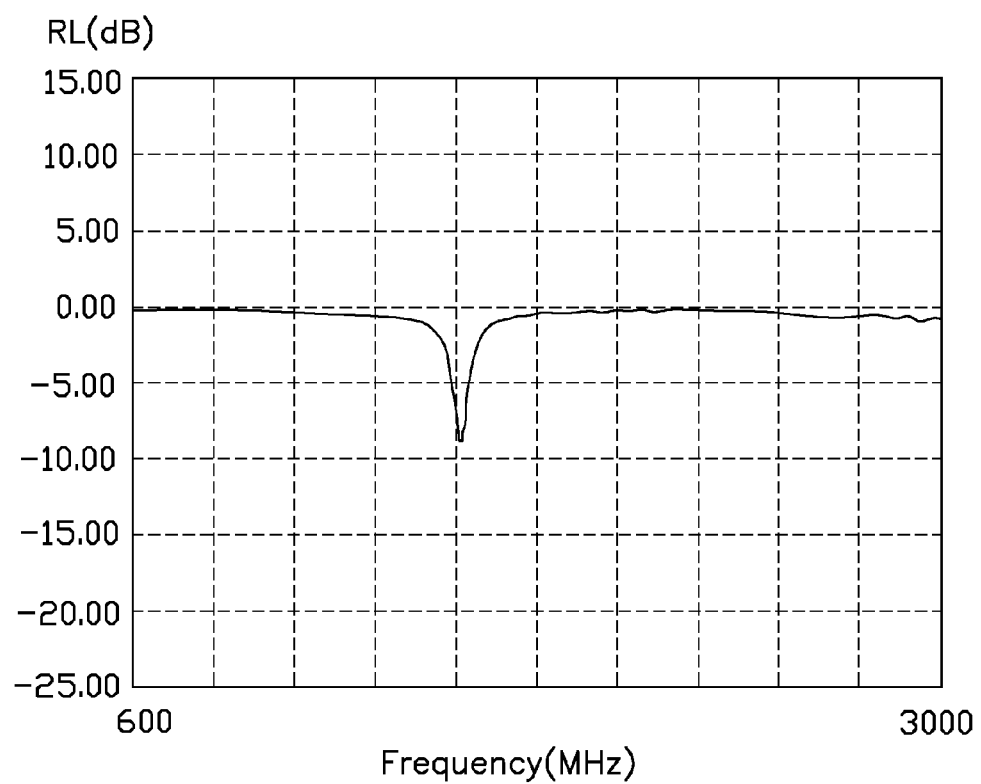
FIG. 4 is similar to FIG. 3, but showing the wireless communication device working at a GPS frequency band.

Referring to FIGS. 3 and 4, when a current flows through the first metal body 22 from the feed terminal 121 adjacent to the fourth end 214, the first metal body 22 serves as a first antenna of the wireless communication device 100 to receive/send wireless signals of a first frequency band by adjusting a length of the first metal body 22 and a distance between the first ground portion 221 and the first feed portion 223. In this exemplary embodiment, the first frequency band has a central frequency of about 2400-2500 megaHertz (MHz). Therefore, the wireless communication device 100 is operable at a BT/WIFI frequency band.

Similarly, when the current flows through the second metal body 23 from the feed terminal 121 adjacent to the first end 211, the second metal body 23 serves as a second antenna of the wireless communication device 100 to receive/send wireless signals of a second frequency band by adjusting a length of the second metal body 23 and a distance between the second ground portion 231 and the second feed portion 235. In this exemplary embodiment, the second frequency band has a central frequency of about 1575 MHz. Therefore, the wireless communication device 100 is operable at a GPS frequency band.

FIGS. 3 and 4 show that when the wireless communication device 100 receives/sends wireless signals at frequencies of about 2400-2500 MHz or around about 1575 MHz, the RL of the wireless communication device 100 satisfies communication standards.

The first metal body 22 and the second metal body 23 serves as antennas of the wireless communication device 100. Since the metal board 20 is located on the circuit board 10, the first metal body 22 and the second metal body 23 are directly connected to the feed terminals 121 and the ground terminals 122 of the circuit board 10 to ensure that the wireless communication device 100 receives/sends wireless signals more stably. In addition, the first metal body 22 and the second metal body 23 extend away from the metal board 20 such that the first metal body 22 and the second metal body 23 are away from the display module 30. Thus, an electromagnetic interference is reduced and a radiating capability of the antennas of the wireless communication device 100 is effectively improved.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A wireless communication device, comprising:
   a circuit board comprising two groups of connecting terminals;
   a metal board located on the circuit board and comprising a main body and two metal bodies extending from an end of the main body, wherein the main body comprises a first end, a second end, a third end, and a fourth end, the first end and the third end are parallel to each other, the second end and the fourth end are parallel to each other and interconnected between the first end and the third end; the two metal bodies comprise a first metal body and a second metal body, the first metal body comprises a first ground portion, an extending portion, and a first feed portion, the first ground portion is electronically connected to a junction of the first end and the fourth end and extends away from the fourth end; the extending portion is connected to the first ground portion, extends towards the second end, and is parallel to the first end; the first feed portion is connected to a side of the extending portion adjacent to the first ground portion and extends towards the first end; and
   a display module located on the main body; wherein the first ground portion and the first feed portion are electronically connected to one group of connecting terminals, the second metal body is electronically connected to the other group of connecting terminals.

2. The wireless communication device of claim 1, wherein one group of connecting terminals is located on a first side of the circuit board, the other group of connecting terminals is located on a second side of the circuit board opposite to the first side, each group of connecting terminals comprises a feed terminal and a ground terminal adjacent to the feed terminal.

3. The wireless communication device of claim 2, wherein the first ground portion is electronically connected to a ground terminal adjacent to the fourth end; the first feed portion is electronically connected to a feed terminal adjacent to the fourth end.

4. The wireless communication device of claim 2, wherein the second metal body is connected to and extends away from a junction of the first end and the second end.

5. The wireless communication device of claim 4, wherein the second metal body comprises a second ground portion, a first connecting portion, a second connecting portion, a third connecting portion, and a second feed portion, the second ground portion is connected to a junction of the first end and the second end and extends towards the fourth end; the first connecting portion is perpendicularly connected to the second ground portion, extends towards the fourth end, and is parallel to the first end; the second connecting portion is perpendicularly connected to an end of the first connecting portion and extends away from the first end; the third connecting portion is perpendicularly connected to an end of the second connecting portion, extends towards the second portion, and is parallel to the first connecting portion; the second feed portion is electronically connected to a side of the first connecting portion adjacent to the second ground portion, extends towards the first end, and is parallel to the second connecting portion.

6. The wireless communication device of claim 5, wherein the second ground portion is electronically connected to a ground terminal adjacent to the second end; the second feed portion is electronically connected to a feed terminal adjacent to the second end.

7. A wireless communication device, comprising:
   a circuit board comprising two groups of connecting terminals, wherein one group of connecting terminals is located on a first side of the circuit board, the other group of connecting terminals is located on a second side of the circuit board opposite to the first side, each group of connecting terminals comprises a feed terminal and a ground terminal adjacent to the feed terminal;

a metal board located on the circuit board;

a display module, the metal board sandwiched between the circuit board and the display module;

a first metal body coplanar with the metal board, extending from a first side of the metal board and electronically connected to one group of connecting terminals; and a second metal body coplanar with the metal board, extending from a second side of the metal board opposite to the first side and electronically connected to the other group of connecting terminals; wherein the first metal body serves as a first antenna of the wireless communication device to receive/send wireless signals of a first frequency band, the second metal body serves as a second antenna of the wireless communication device to receive/send wireless signals of a second frequency band.

8. The wireless communication device of claim 7, wherein the metal board further comprises a main body for supporting the display module, wherein the first and second metal bodies extend from an end of the main body.

9. The wireless communication device of claim 8, wherein the main body comprises a first end, a second end, a third end, and a fourth end, the first end and the third end are parallel to each other, the second end and the fourth end are parallel to each other and interconnect to the first end and the third end.

10. The wireless communication device of claim 9, wherein the first metal body is connected to and extends away from a junction of the first end and the fourth end; the second metal body is connected to and extends away from a junction of the first end and the second end.

11. The wireless communication device of claim 10, wherein the first metal body comprises a first ground portion, an extending portion, and a first feed portion, the first ground portion is electronically connected to a junction of the first end and the fourth end and extends away from the fourth end; the extending portion is connected to the first ground portion, extends towards the second end, and is parallel to the first end; the first feed portion is connected to a side of the extending portion adjacent to the first ground portion and extends towards the first end.

12. The wireless communication device of claim 11, wherein the first ground portion is electronically connected to a ground terminal adjacent to the fourth end; the first feed portion is connected to a feed terminal adjacent to the fourth end.

13. The wireless communication device of claim 10, wherein the second metal body comprises a second ground portion, a first connecting portion, a second connecting portion, a third connecting portion, and a second feed portion, the second ground portion is connected to a junction of the first end and the second end and extends towards the fourth end; the first connecting portion is perpendicularly connected to the second ground portion, extends towards the fourth end, and is parallel to the first end; the second connecting portion is perpendicularly connected to an end of the first connecting portion and extends away from the first end; the third connecting portion is perpendicularly connected to an end of the second connecting portion, extends towards the second end, and is parallel to the first connecting portion; the second feed portion is electronically connected to a side of the first connecting portion adjacent to the second ground portion, extends towards the first end, and is parallel to the second connecting portion.

14. The wireless communication device of claim 13, wherein the second ground portion is electronically connected to a ground terminal adjacent to the second end; the second feed portion is electronically connected to a feed terminal adjacent to the second end.

15. The wireless communication device of claim 7, wherein a central frequency of the first frequency band is about of 2400-2500 MHz, a central frequency of the second frequency band is about of 1575 MHz.

16. A wireless communication device, comprising:

a circuit board comprising two groups of connecting terminals;

a metal board located on the circuit board and comprising a main body, wherein the main body comprises a first end, a second end, a third end, and a fourth end, the first end and the third end are parallel to each other, the second end and the fourth end are parallel to each other and interconnect to the first end and the third end;

a display module, the metal board sandwiched between the circuit board and the display module;

a first metal body extending from a first side of the main body and electronically connected to one group of connecting terminals, wherein the first metal body comprises a first ground portion, an extending portion, and a first feed portion, the first ground portion is electronically connected to a junction of the first end and the fourth end and extends away from the fourth end; the extending portion is connected to the first ground portion, extends towards the second end, and is parallel to the first end; the first feed portion is connected to a side of the extending portion adjacent to the first ground portion and extends towards the first end; and a second metal body extending from a second side of the main body opposite to the first side, and electronically connected to the other group of connecting terminals; wherein the first metal body serves as a first antenna of the wireless communication device to receive/send wireless signals of a first frequency band, the second metal body serves as a second antenna of the wireless communication device to receive/send wireless signals of a second frequency band.

17. The wireless communication device of claim 16, wherein one group of connecting terminals is located on a first side of the circuit board, the other group of connecting terminals is located on a second side of the circuit board opposite to the first side, each group of connecting terminals comprises a feed terminal and a ground terminal adjacent to the feed terminal; the first ground portion is electronically connected to a ground terminal adjacent to the fourth end; the first feed portion is connected to a feed terminal adjacent to the fourth end.

18. The wireless communication device of claim 17, wherein the second metal body comprises a second ground portion, a first connecting portion, a second connecting portion, a third connecting portion, and a second feed portion, the second ground portion is connected to a junction of the first end and the second end and extends towards the fourth end; the first connecting portion is perpendicularly connected to the second ground portion, extends towards the fourth end, and is parallel to the first end; the second connecting portion is perpendicularly connected to an end of the first connecting portion and extends away from the first end; the third connecting portion is perpendicularly connected to an end of the second connecting portion, extends towards the second end, and is parallel to the first connecting portion; the second feed portion is electronically connected to a side of the first connecting portion adjacent to the second ground portion, extends towards the first end, and is parallel to the second connecting portion.

19. The wireless communication device of claim 18, wherein the second ground portion is electronically connected to a ground terminal adjacent to the second end; the second feed portion is electronically connected to a feed terminal adjacent to the second end.

* * * * *